Nov. 11, 1958 O. O. MOULDEN Re. 24,560
WIRE PACKAGE
Original Filed Sept. 21, 1955
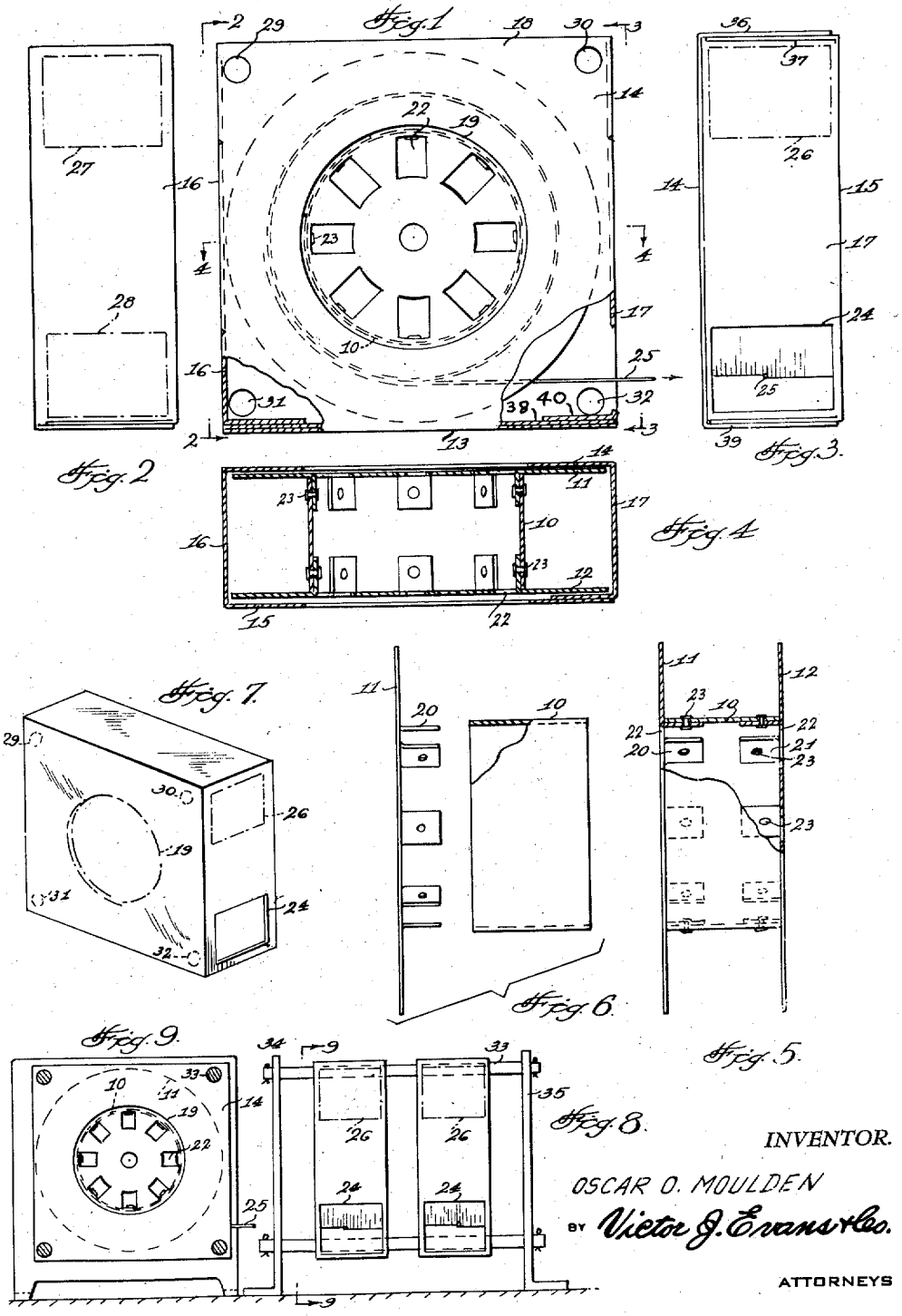
INVENTOR.
OSCAR O. MOULDEN
BY Victor J. Evans & Co.
ATTORNEYS United States Patent Office Re. 24,560
Reissued Nov. 11, 1958

24,560

WIRE PACKAGE

Oscar O. Moulden, Duncan, Okla.

Original No. 2,822,992, dated February 11, 1958, Serial No. 535,627, September 21, 1955. Application for reissue May 22, 1958, Serial No. 737,178

5 Claims. (Cl. 242—137.1)

Matter enclosed in heavy brackets [ ] appears in the original patent but forms no part of this reissue specification; matter printed in italics indicates the additions made by reissue.

This invention relates to packaging materials and particularly materials such as insulated wire which is supplied, used, and sold from coils in substantially square cardboard or corrugated paper boxes, the sides of which are provided with circular openings through which the wire is removed; and in particular a rectangular shaped box having a circular opening in one side and also having openings in corners, and a spool freely positioned in and rotatable in said box and having finger receiving openings in the sides whereby wire, cables and cords, including building wire, romex cable, rubber cords, telephone wire and cables, bell wire, annunciation wire, magnet wire and automotive wires and cables are adapted to be readily drawn from the box without kinking and wherein the spool is adapted to be rotated to rewind unused wire.

The purpose of this invention is to provide means for withdrawing wire and the like from paper boxes without kinking or otherwise twisting or damaging the wire.

Insulated wire such as used for electric lights, automatic controls, telephone circuits and electrical instruments and appliances and the like is supplied in square boxes with openings in the sides and the wire is drawn from the openings. Drawing wire from a coil in which the wire is freely positioned causes the wire to kink with substantially each coil and when drawing wire from such a box so that the wire may be fed through a conduit or the like it is substantially essential that one man force the wire through the conduit as another prevents kinkage of the wire as it leaves the box and this results in considerable waste of time and also additional help. With this thought in mind this invention contemplates winding the wire of packages of this type on a spool freely positioned in the package whereby upon drawing wire from the package the spool rotates feeding a continuous strand of wire from the package.

The object of this invention is, therefore, to provide means for packaging wire and the like whereby one man may draw wire from a package and feed it through a conduit without danger of the wire kinking or becoming tangled.

Another object of the invention is to provide an improved package for insulated wire and the like in which means is provided for rewinding unused wire in the package.

A further object of the invention is to provide an improved package for insulated wire and other similar materials in which the wire is contained on a spool freely positioned in a box in which the package is of a simple and economical construction.

With these and other objects and advantages in view the invention embodies a substantially square box having circular openings in the sides and also openings in and adjacent the corners, and a spool having a drum mounted between flanges with tangs struck from the flanges and secured to the drum and in which openings from which the tangs are struck are provided in the portions of the flanges positioned within the drum of the spool whereby with the openings in registered relation with the circular opening of the side of the box the thumb and fingers of a hand may be inserted therein for rotating the spool to rewind wire thereon.

Other features and advantages of the invention will appear from the following description taken in connection with the drawing, wherein:

Figure 1 is a front elevational view of the improved wire package with part of the lower corners broken away showing the construction thereof.

Figure 2 is an end elevational view looking toward one end of the package taken on line 2—2 of Figure 1.

Figure 3 is an end elevational view looking toward the opposite side of the package taken on line 3—3 of Figure 1.

Figure 4 is a sectional plan through the package taken on line 4—4 of Figure 1.

Figure 5 is an end elevational view of the spool used in the package, the upper part of the spool being broken away and remaining parts thereof being shown in sections.

Figure 6 is an exploded view showing the drum of the spool with parts broken away also showing one of the flanges adapted to be secured to the end of the drum.

Figure 7 is a perspective view showing the box with a circular opening in one side.

Figure 8 is a front elevational view showing a pair of the boxes positioned on a rack.

Figure 9 is a cross section of the rack shown in Figure 8 taken on line 9—9 thereof.

Referring now to the drawing wherein like reference characters denote corresponding parts the improved wire package of this invention includes a spool having a cylindrical drum 10 with flanges 11 and 12 at the ends and a housing in the form of a box including a base 13, side walls 14 and 15, end walls 16 and 17 and an upper panel 18 and, as shown in Figure 1, the side wall or front is provided with a circular opening 19 through which the intermediate part of the spool is exposed.

The flanges 11 and 12 are secured to the cylindrical portion or drum of the spool with tangs 20 and 21 which are struck from openings 22 in the flanges 11 and 12 and the tangs are secured to the drum 10 by staples 23 or with suitable fastening means.

The end wall 17 of the box is provided with an outlet opening 24 through which wire, as indicated by the numeral 25, may be drawn from the spool, as illustrated in Figure 1. The upper portion of the end wall 17 is also provided with score lines 26 to facilitate providing an opening in the upper part thereof and score lines for similar openings, as indicated by the numerals 27 and 28 are provided in the end wall 16 at the opposite side of the package.

The side walls 14 and 15 of the box are also provided with aligned openings 29, 30, 31, and 32 in the corners through which bars, such as the bars 33 of a rack, such as a rack illustrated in Figures 8 and 9, may be placed so that a plurality of the boxes with spools of wire therein may be suspended on a rack and wire drawn from openings, such as the opening 24 therein as the wire is used from the box.

In the design shown, the bars 33 are mounted in uprights or hangers 34 and 35 and it will be understood that the hangers or other supporting elements may be of any suitable type or design and may be spaced according to the number of boxes desired to be used thereon and that as many of the boxes may be used on the rack as desired.

One, or a plurality of boxes, may be used on a counter with each containing a different type of wire or one or a plurality of the boxes may be carried from place to place as wire is used therefrom.

As more wire is drawn from the box than is desired the wire may be replaced by placing the fingers of a hand in the openings 22 of the spool and rotating the spool to rewind the wire.

Also as illustrated in the drawing the boxes are formed with end flaps 36 and 37 at the top; 38 and 39 at the bottom, and flaps, such as the flaps 40 may extend inwardly from the end walls inside of the flaps 37 and 38, as shown in Figure 1. Boxes of any suitable material may be used and the boxes may be formed in any manner desired.

With boxes positioned as illustrated and described the spool is freely mounted in a box so that upon drawing a strand of wire, such as the wire 25 from the box the spool rotates unwinding the wire and all possibility of kinking the wire is substantially eliminated.

Making it possible to rewind unused wire in a package eliminates enormous waste as wire extended from the box is subjected to light and particularly the rays of the sun, whereby colored cords fade or become discolored and rubber of the insulation deteriorates.

With the improved package of this invention the unused lengths of wire are retrieved so that they may be retained in the dark and away from light and sun rays.

The size, weight and grade of paper used in making these boxes shall conform to Uniform Freight Classification.

The size will depend on size, length and insulation of the manufacturer of wire as all wires are not covered with the same insulation, and cords and cables include one or a plurality of conductors.

Use of this type box and reel will enable workmen on jobs to save a tremendous amount of time and labor.

The improved box will prevent tangled and twisted wire which results in damaged insulation, and lost time.

*It will be apparent from the foregoing that there will be an inherent braking function in the spool of the disclosure package. The weight of the spool and the frictional engagement between the spool and the inside walls of the enclosing box will provide a braking drag on the spool as the wire is being unwound therefrom. This self-braking function will prevent the wire from becoming kinked or tangled and will prevent the spool from overspinning as the wire is being unwound therefrom.*

It will be understood that other modifications, within the scope of the appended claims, may be made in the design and arrangement of the parts without departing from the spirit of the invention.

What is claimed is:

1. A [wire] package *for wire or other elongated flexible material* comprising a [square paper] box having a base with upwardly extended side and end walls and having a circular opening in one of said side walls and openings in the [end] *side* walls and positioned at the corners of the box, and a [paper] spool having a drum with flanges at the ends freely mounted in said box and having finger receiving openings positioned in registered relation with the circular opening in the side of the box whereby the fingers of a hand may be inserted through the circular opening in the side wall of the box for rotating the spool.

2. A [wire] package *for wire or other elongated flexible material* comprising a [square paper] box having a base with upwardly extended side and end walls and having a circular opening in one of said side walls and openings in the [end] *side* walls and positioned at the corners of the box, and a [paper] spool having a drum with flanges at the ends freely mounted in said box and having finger receiving openings positioned in registered relation with the circular opening in the side of the box whereby the fingers of a hand may be inserted through the circular opening in the side wall of the box for rotating the spool, the material struck from the finger receiving openings of the flanges of the spool being secured to the drum for mounting the flanges on the drum.

3. A [wire] package *for wire or other elongated flexible material* comprising a [square paper] box having a base with upwardly extended side and end walls and having a circular opening in one of said side walls and transverse and longitudinally disposed openings in the [end] *side* walls and positioned at the corners of the box, and a [paper] spool having a drum with flanges at the ends freely mounted in said box and having finger receiving openings positioned in registered relation with the circular opening in the side of the box whereby the fingers of a hand may be inserted through the circular opening in the side wall of the box for rotating the spool, the material struck from the finger receiving openings of the flanges of the spool being secured to the drum for mounting the flanges on the drum.

4. In a [wire] container *for wire or other elongated flexible material,* the combination which comprises a box having a base with upwardly extended side and end walls and having a circular opening in one of said side walls, transversely disposed rack bar receiving openings in the corners, and scored sections for providing *at least one* outlet [openings] *opening* in *one of said* [the] end walls and a spool having a drum with flanges on the ends freely positioned in said container, the flanges of the spool being secured to the drum by tangs struck from the flanges and [stapled] *secured* to the drum, and the openings from which the tangs are struck providing thumb and finger receiving openings to facilitate manually rotating the spool.

5. *A combination package and spool for wire or other elongated flexible material comprising; a sealed box having a pair of spaced side walls, said side walls being connected by two end walls, a base, and a top, to form a closed box, a large access opening in at least one of said side walls, an outlet opening for the flexible material in one of the walls connecting said side walls, a double flanged spool freely mounted and rotatable in said box, and finger receiving openings in at least one flanged end of the spool adapted for manual engagement, said finger receiving openings positioned adjacent and in registered relation with the large access opening in the side of the box whereby the finger receiving openings may be manually engaged through the access opening in the side wall of the box for rotating the spool to wind or rewind the material thereon.*

References Cited in the file of this patent or the original patent

| | | |
|---|---|---|
| 1,076,635 | Howard | Oct. 21, 1913 |
| 1,112,062 | Gardner | Sept. 29, 1914 |
| 1,154,212 | Schloss et al. | Sept. 21, 1915 |
| 1,431,352 | Abbott | Oct. 10, 1922 |
| 1,947,351 | Macklanburg | Feb. 13, 1934 |
| 2,048,307 | Weber | July 21, 1936 |
| 2,201,305 | Springer | May 21, 1940 |
| 2,554,615 | Dahle | May 29, 1951 |

FOREIGN PATENTS

| | | |
|---|---|---|
| 998,828 | France | Sept. 26, 1951 |